May 23, 1967 C. A. BOYD ETAL 3,320,808
APPARATUS AND METHOD FOR ACOUSTIC INSTRUMENTATION
Filed May 12, 1964 4 Sheets-Sheet 3
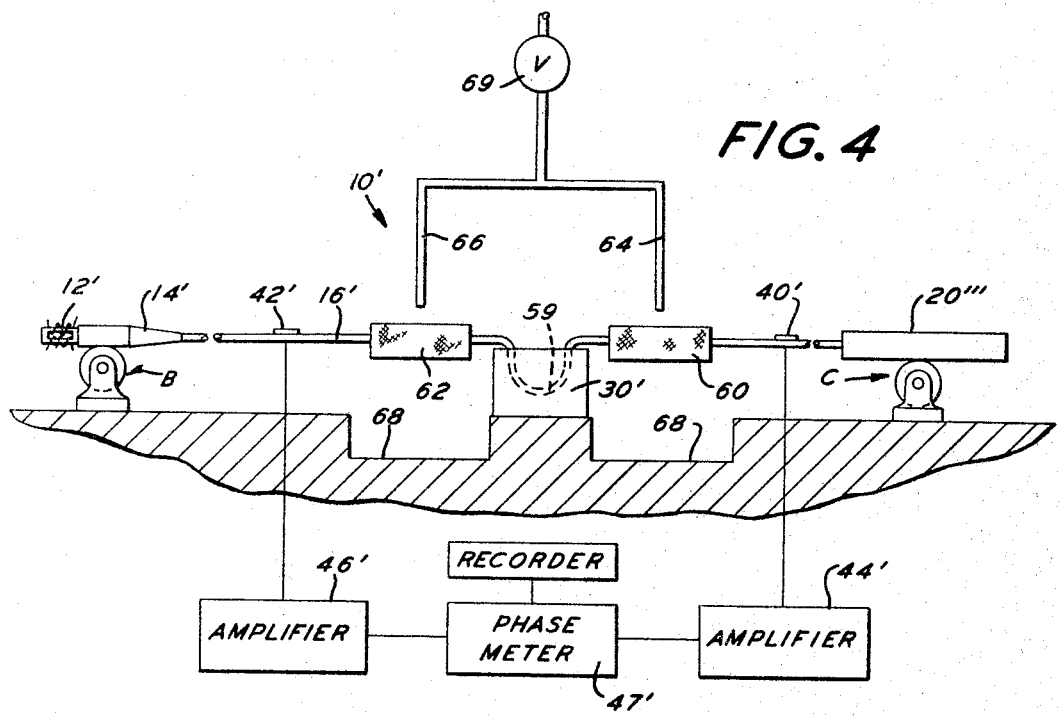
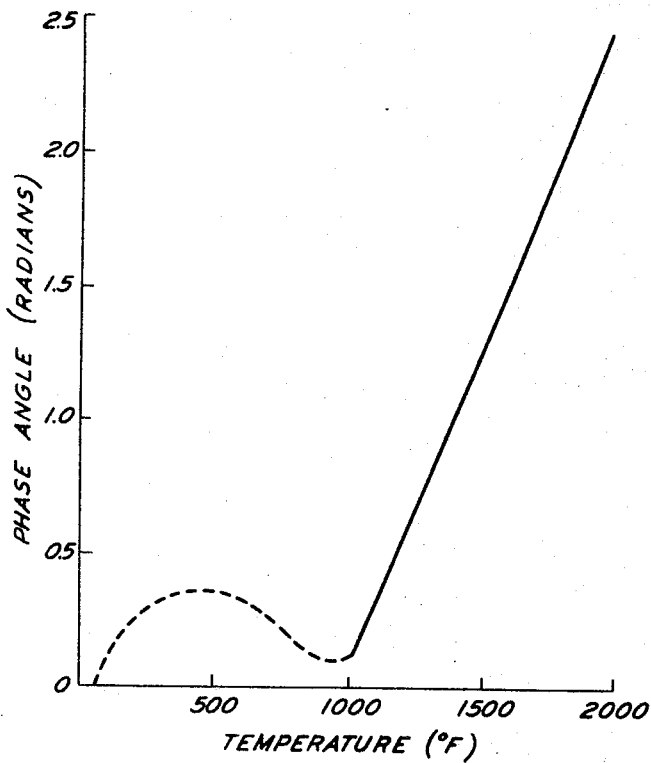
INVENTORS
CHARLES A. BOYD
HERBERT KARTLUKE
BY
ATTORNEYS.

INVENTORS
CHARLES A. BOYD
HERBERT KARTLUKE

BY Seidel & Gonda

ATTORNEYS.

United States Patent Office 3,320,808
Patented May 23, 1967

3,320,808
APPARATUS AND METHOD FOR ACOUSTIC INSTRUMENTATION
Charles A. Boyd, Dunn Loring, Va., and Herbert Kartluke, West Chester, Pa., assignors, by mesne assignments, to the United States of America as represented by the United States Atomic Energy Commission
Filed May 12, 1964, Ser. No. 366,874
20 Claims. (Cl. 73—339)

This invention relates to apparatus and method for acoustic instrumentation, and more particularly to a vibratory energy apparatus and method utilizing traveling acoustic waves to obtain indication of material properties, such as temperature.

There are many available devices and methods for obtaining temperature indications and measurements. For example, a body whose temperature is to be determined may serve as its own thermometer (indications of temperature being obtained through characteristics such as pressure, electrical resistance, thermal expansion, etc.), or auxiliary-type thermometers may be used. These include liquid-filled thermometers, gas thermometers, electrical resistance thermometers, radiation pyrometers, vapor pressure thermometers, bimetallic thermometers, thermocouples, optical pyrometers, and color indicating paints and crayons—all of which are useful in certain temperature ranges and for certain applications.

It is an object of the present invention to provide a novel method and apparatus for temperature measurements.

It is another object of the present invention to provide a novel method and apparatus for measuring the temperature of a solid, liquid or gas in a manner which can be continuous and which can include the provision of a permanent record of temperature changes.

It is another object of the present invention to provide a temperature indicating appartus which is accurate, convenient, effective, rugged, dependable, and reasonably economical.

Other objects will appear hereinafter.

For the purpose of illustrating the invention, there is shown in the drawings forms which are presently preferred, it being understood, however, that this invention is not limited to the precise arrangements and instrumentalities shown.

FIGURE 3 is a graph showing results obtained in accordance with the present invention, using steel transmission lines.

FIGURE 4 is a diagrammatic elevational view, with parts in section, of another embodiment of apparatus of the present invention.

Referring to the drawings in detail, wherein like numerals indicate like elements, there is shown in FIGURE 1 a vibratory temperature indicating apparatus designated generally as 10.

Figure 1:
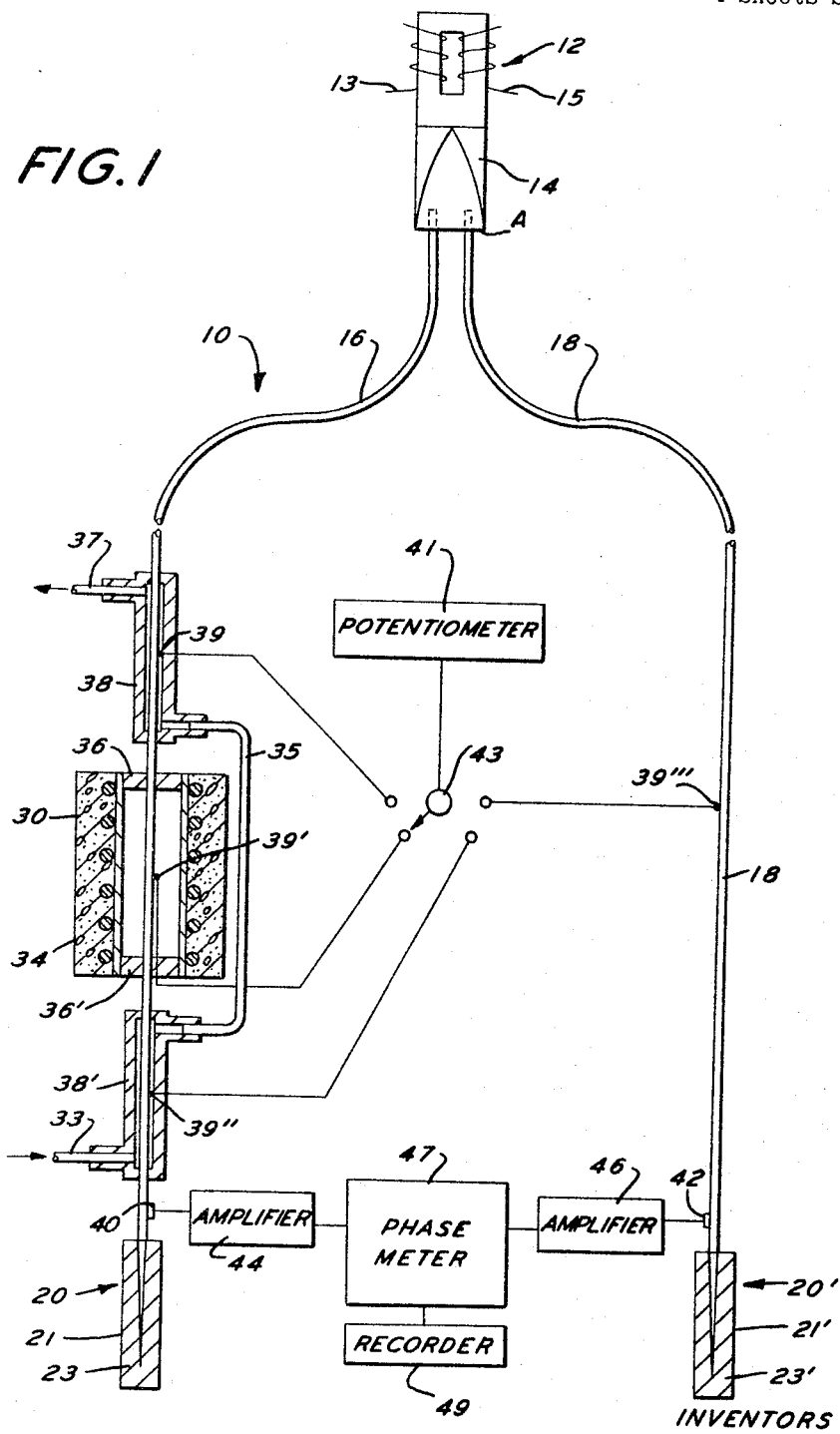
FIGURE 1 is a diagrammatic elevational view, with parts in section, of one embodiment of apparatus according to the invention.

The apparatus 10 is essentially an ultrasonic transducer-coupling system and includes an electromechanical transducer 12, a coupling member 14, a coupling member 16 and a coupling member 18. Each of the coupling members 16 and 18 extends into an acoustical absorber; thus, member 16 is effectively terminated in and by acoustical absorber 20, and member 18 is similarly terminated in and by acoustical absorber 20[1].

The electromechanical transducer 12 is of conventional construction comprising a laminated core of nickel, nickel-iron alloy, Permendur (an iron-cobalt alloy), Alfenol (an aluminum-iron alloy), or other magnetostrictive material, properly dimensioned to insure axial resonance with the frequency of the alternating current applied thereto by excitation coil 13 so as to cause it to decrease or increase in length according to its coefficient of magnetostriction. The detailed construction of a suitable magnetostrictive transducer, which in the illustrated embodiment comprises a nickel stack, is well known to those skilled in the art and, as above indicated, does not form a part of the present invention and, accordingly, no description of its construction will be made herein.

It will be appreciated by those skilled in the art that in place of the magnetostrictive transducer 12 shown in the drawing, other known types of transducers may be substituted; for example, electrostrictive or piezoelectric transducers, made of barium titanate, lead zirconate titanate, quartz crystals, etc., may be utilized.

Excitation coil 13 is connected to a power supply (not shown) incorporating an oscillator and amplifier suitable for powering the transducer 12; such equipment is well known to the art. The transducer 12 is also provided with a polarizing coil 15, the desirability of magnetically polarizing the transducer 12 by means of polarizing coil 15, in order for the metal laminations in transducer 12 to efficiently convert the applied energy from excitation coil 13 into elastic vibratory energy being readily understood by those skilled in the art. In FIGURE 1, a 25-watt power supply was used to drive a transducer 12 having a design frequency of 50,000 cycles per second.

The magnetostrictive transducer 12 is metallurgically bonded in end-to-end contact, as by silver brazing or the like, to the coupling member 14. Coupling member 14 may be any one of a wide variety of coupling members known to the art, and is preferably made of suitable material such as steel, aluminum bronze, beryllium copper, or Monel. In the embodiment shown in FIGURE 1, coupling member 14 is of conventional contoured construction for purposes of increasing amplitude of vibration. Preferably for some applications, although not shown in FIGURE 1 for lack of space, there is between transducer 12 and coupling member 14 another acoustical coupling member in the form of a cylindrical bar one or more one-half wavelengths long which is brazed at one end to transducer 12 and brazed or screw-connected at its other end to the tapered member shown in FIGURE 1 as coupling member 14. The tapered portion of coupling member 14 may be shaped so as to have a taper that is an exponential function of its length and satisfies the following equation:

$$S = S_0 e^{-2Tl}$$

where $S$ is the reduced area at any section of the coupling member 14, $S_0$ is the area of the cylindrical portion above mentioned, $T$ is a constant describing the taper, and $l$ is the length of the tapered coupling member. This equation and the boundary conditions for resonance of a coupler such as coupler 14 are set forth at page 163 of Piezoelectric Crystals and Ultrasonics by Warren P. Mason, published in 1950 by D. Van Nostrand Company.

Tapered coupling member 14 is metallurgically bonded or screw-connected to acoutsical coupling members 16 and 18.

The elements 12, 14, 16, and 18 are preferably resonant lengths of metal; by this is meant that each of the elements 12, 14, 16, and 18 will preferably have a length equal to a whole number multiple of one-half wavelength (or an even number of one-quarter wavelengths), in the material of which it is made at the frequency at which the apparatus is designed to operate. The length of the apparatus, from the free end of the transducer 12 to the terminal ends of the coupling members 16 and 18 preferably is such that an antinode (or loop) area of the vibratory energy is juxtaposed to each of the acoustical absorbers 20 and 20'.

Choice of material for the coupling members, and especially for the coupling members 16 and 18, and also the choice of a joining method for joining the components of the apparatus 10 may be restricted by environmental requirements (such as nuclear requirements on a nuclear application, high temperatures, high pressures, corrosive media, etc.) in addition to acoustical requirements. Thus, stainless steel is an acceptable material for coupling members 14, 16, and 18, since it is capable of being connected by a no-flux joining method such as heliarc welds, which method is important and desirable for nuclear applications.

In the illustrated embodiment (designed to operate at 50,000 cycles per second), the coupling members 14, 16 and 18 are of cold-rolled steel. The coupling members 16 and 18 are of ¼-inch cold-rolled-steel rod which has been symmetrically bent, for purposes which will be explained below. The bend radius for the arcuate portions of members 16 and 18 is preferably greater than $\lambda/4$ where $\lambda$ is the wavelength for the material of members 16 and 18.

The present invention, including the embodiment of FIGURE 1, is designed to operate with progressive (sometimes called traveling) acoustical waves rather than with standing acoustical wave patterns. Such progressive wave conditions are made possible by use of the aforementioned acoustical absorbers 20 and $20^1$ in conjunction with the vibratory apparatus of FIGURE 1.

Thus, the wave train from the transducer 12 is split at the point marked A into identical trains, which travel (at the same frequency and in the same phase) along the separate acoustic paths provided by members 16 and 18 into the two acoustical absorbers 20 and $20^1$. Hereinafter coupling member 16 may be referred to as a measuring leg and member 18 may be referred to as a reference leg.

For optimum operation, the acoustical absorbers 20 and $20^1$ should be as nearly perfect absorbers and as identical as possible. As shown in FIGURE 1, acoustical absorber 20, for example, comprises a copper pot 21 containing a mass of metallic lead 23. Absorber 20 was made by brazing a copper plug in one end of a length of 1-inch O.D. copper tubing; filling the tube with molten lead; immersing the terminal end of the measuring leg 16 (which end had been previously tinned with a commercially-available tin-lead solder, to insure thorough wetting by the molten lead and uniform bonding to the lead) in the molten lead; and then allowing the lead to cool and solidify so that the leg 16's terminal end was centered with respect to the copper tubing.

In FIGURE 1, each of the legs 16 and 18 is shown as tapered to a long point at its end contacting its respective acoustical absorber. Each of the legs 16 and 18 is further provided with a sensing element. Thus, measuring leg 16 is provided with a sensing element 40, and reference leg 18 is provided with a sensing element 42.

Each of the sensing elements 40 and 42 could be a small electromechanical transducer, such as one made of an electrostrictive material such as barium titanate, which will produce an alternating electrical signal proportional to the alternating mechanical displacement of a particle at the point of attachment. These elements are acceleration sensitive, and the mechanical acceleration is 180 degrees out of phase with the displacement. Such elements are shown and described in copending application Ser. No. 66,642 filed Nov. 1, 1960, for "Method and Apparatus for Measurement of Acoustic Power Transmission and Impedance" by Dennison Bancroft et al.; there, however, they were shown as being utilized in a standing wave pattern rather than with progressive waves. They are also shown and described in copending applications Ser. No. 282,180 filed May 21, 1963, entitled, "Method and Apparatus Utilizing Vibratory Energy," by Nicholas Maropis, now Patent No. 3,246,516, and Ser. No. 283,646 filed May 27, 1963, entitled, "Method and Apparatus Employing Vibratory Energy," by Nicholas Maropis, where they were used in pairs attached to a single coupling member at appropriately spaced acoustical distances from one another.

Each of the sensing elements 40 and 42 must be small enough so as not to have its inertial mass affect the operation of the acoustical coupling member or leg to which it is attached. For most applications a ratio of masses of 1000 to 1 is adequate. As indicated in the first above-mentioned copending application of Bancroft et al., satisfactory sensing elements may comprise, for example, to use with FIGURE 1 hereof, barium titanate crystals (½-inch by 0.012-inch by ⅛-inch) to which are attached two brass or gold conductor strips 0.001-inch thick by ³⁄₃₂-inch wide by 1½-inch long, the connector strips being attached uniformly along the entire face of the barium titanate crystal.

The sensing elements 40 and 42 may be adhesively attached to the coupling members or legs 16 and 18 respectively, and for purposes of protection may be covered with plastic electrical tape.

As noted above, each of the sensing elements 40 and 42 has two leads to which wires are attached for carrying the alternating electrical signal generated by the sensing elements to the associated instrumentation. In the case of FIGURE 1, the associated instrumentation comprises a voltage amplifying circuit 44 for measuring leg 16 and a voltage amplifying circuit 46 for reference leg 18, plus a phase angle meter 47. The voltage amplifying circuits 44 and 46 are used for purposes of adjustment of the respective signals from the sensing elements 40 and 42 for proper operation of the phase angle meter 47.

Detector or meter 47 may be a Vectorlyzer Type 202, manufactured by Ad-Yu Electronics Laboratory, Inc., Passaic, N.J. Meter 47 indicates the phase difference between the aforesaid signals from sensing elements 40 and 42, and the Vectorlyzer indicated has an accuracy of $3.5 \times 10^{-4}$ radians, which corresponds roughly to an accuracy in length measurement of about 0.003-inch. The voltage amplifier circuits 44 and 46 and the phase meter 47 are not described in detail, inasmuch as they, per se, are of conventional and well known construction. A permanent record of temperature changes may be obtained by coupling the meter 47 to recorder 49 which per se is of conventional construction.

The location of the sensing elements is of importance to the present invention. Thus, during operation of the embodiment of FIGURE 1, a portion of the measuring leg 16 will be in contact with the medium whose temperature is to be monitored or indicated (as explained below); therefore, the sensing element 40 must be located along measuring leg 16 between the medium-contacting portion of leg 16 and the acoustical absorber 20. Also, the sensing element 42 must be located on reference leg 18 with respect to the location of sensing element 40 on measuring leg 16. That is, sensing element 42's location on leg 18 should be at the same acoustical distance from the coupling member 14 as is sensing element 40's location on 16.

Since the measuring leg 16 and the reference leg 18 are identical in this regard, if both are in thermal equilibrium at ambient temperature, the acoustic traveling wave proceeding from point A down each leg will cause amplitude responses in sensing elements 40 and 42 at exactly the the same time; i.e., the responses are *in phase*. If a portion of the measuring leg, only, is heated, the velocity of sound in this portion will be reduced and the amplitude response in sensing element 40 will appear later in time than the corresponding response in sensing element 42; i.e., the responses are *out of phase*. The electrical voltages from the sensing elements resulting from these responses are then applied to a phase angle meter which measures the phase difference.

Calibration of the phase meter 47 will then yield a direct measure of the temperature or other difference causing the lag or anticipation of the signal from leg 16 with respect to that from leg 18.

Thus, the time required for a traveling acoustic wave to traverse a given non-medium-affected portion of measuring leg 16 may be expressed as:

$$t_1 = \frac{l_1}{c_1} \quad (1)$$

where $t_1$ = time (in seconds),
$l_1$ = length of the given portion of leg 16 (in centimeters),
$c_1$ = velocity of sound in said given portion (in centimeters).

Similarly, the time required for a traveling acoustic wave to traverse a corresponding portion of reference leg 18 may be expressed as:

$$t_2 = \frac{l_2}{c_2} \quad (2)$$

where the subscript 2 refers to the same parameters but in leg 18 rather than in leg 16.

If the temperature is the same as to both leg 16 and leg 18, then the velocity of sound for each leg will be the same. If the temperature (or other variable to be noted in the medium contacted by leg 16) increases or decreases, the difference will show up in the form of a phase difference between the heated section of leg 16 and absorber 20 and therefore between electrical signals from sensing elements 40 and 42, the respective phase of each such signal being read directly by phase meter 47.

Thus, the phase angle may be expressed as:

$$\phi = \omega l \left( \frac{1}{c_1} - \frac{1}{c_2} \right) \quad (3)$$

where $\phi$ = phase angle (in radians),
$\omega$ = angular frequency (known to the art as $2\pi f$, where $f$ is vibration frequency),
$l$ = length of heated section on leg 16 (in centimeters).

Thus, the phase angle is proportional to the temperature difference (or other-caused difference) in the vibratory operation of the corresponding portions on leg 16 and leg 18. For example, a negative value for $\phi$ indicates a lag of leg 16's signal behind leg 18's signal.

Figure 2:
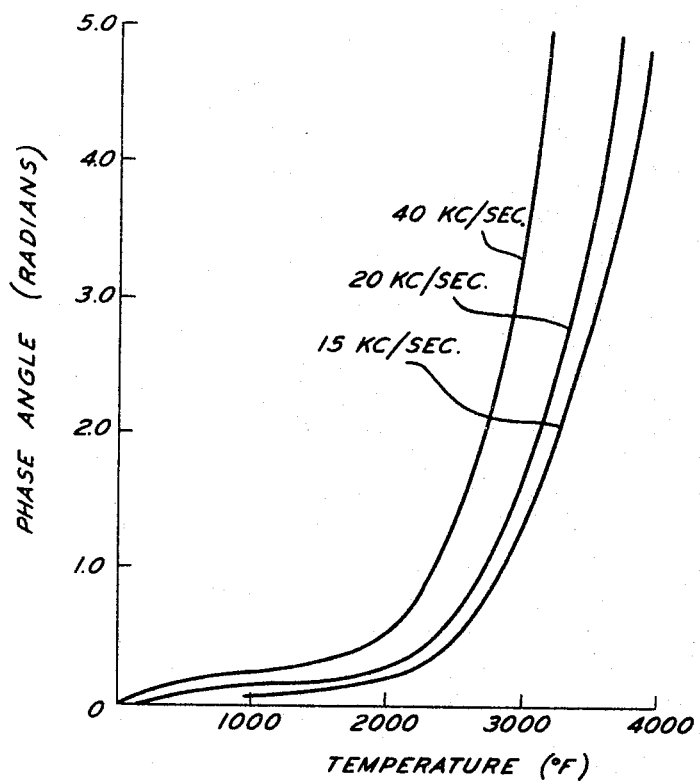
FIGURE 2 is a graph showing calculated variation in phase angle, with temperature for molybdenum acoustical transmission lines, in accordance with the present invention.

If the acoustical transmission lines (coupling member 14 and legs 16 and 18) are made of molybdenum, FIGURE 2 shows that, assuming a 10-centimeter heated section on leg 16, there will be differing variations in phase angle with temperature according to the frequency of operation; e.g., whether it be 15,000 or 20,000 or 40,000 cycles per second. These calculated data show that, with molybdenum transmission lines there would be adequate sensitivity for temperature measurement in the range of from about 500 to about 3750° F., subject to suitable control of other variables.

FIGURE 3 depicts data obtained with cold-rolled steel (density 7.8 gm./cc. basic velocity of sound 5000 meters/ second) as the acoustical material, with the apparatus designed to operate at a nominal frequency of 50,000 cycles per second, and using an electrical power input to the transducer 12 of 9 watts, the heated zone on leg 16 being approximately 17.8 centimeters long. The results show good sensitivtiy, even at the highest temperatures obtainable with this steel as the acoustical material. The irregularity below 1000° F. was probably associated with metallurgical phase transition in the steel in that temperature region, which resulted in non-uniform change in elastic modulus. Molybdenum would have no such phase transitions, and its elastic modulus variation with temperature is known to be regular over a wide range; however, it is difficult to braze well, and a molybdenum apparatus embodiment also provided erratic data attributable to unequal tensions in the legs caused by the load on the heated leg, a condition aggravated as temperature was increased. Also, slight change in furnace position produced great variations in phase angle read-out.

In order to obtain the data of FIGURE 3, the heating of measuring leg 16 was accomplished with an electrical tube furnace, designated 30 in FIGURE 1. This furnace consisted of an alundum tube wound on the outside with nichrome resistance wire, connected to a 110-volt Variac (not shown) for furnace temperature control purposes. Furnace 30 was insulated by means of a firebrick wall 34, cemented in place with sauereisen cement. The ends of the furnace were closed with plugs 36 and $36^1$.

Assembly of the furnace 30 and water jackets 38 and $38^1$ was done prior to attaching the acoustic absorbers 20 and $20^1$. Final seals between the water jackets 38 and $38^1$ and measuring leg 16 were made with epoxy cement. During assembly, thermocouples 39 and $39^1$ and $39^{11}$ and $39^{111}$ were brazed to the apparatus. Thermocouple $39^1$ was of chromel-alumel and was brazed to leg 16 at the midpoint of its location with reference to furnace 30. Thermocouples 39 and $39^{11}$ were of iron-constantan, and each of these was silver-brazed to measuring leg 16 at the midpoint of the respective cooling jacket 38 or $38^1$ involved. Thermocouple $39^{111}$ was brazed to reference leg 18, in order to enable ambient temperature measurement of the system. All four of these thermocouples were connected to a potentiometer 41 through a rotary selector switch 43. Potentiometer 41, switch 43 and the thermocouples were utilized to check the accuracy of data obtained and would not be present in a practical commercial embodiment of the invention.

In operation, the transducer 12 was powered with 9 watts of electrical energy at a nominal frequency of 50 kilocycles per second (actually 50,640 cycles per second), water was circulated through jackets 38 and $38^1$ via conduits 33, 35 and 37, and the system was allowed to come to thermal equilibrium (as indicated by identical readings on all four thermocouples). A phase angle measurement was then taken, which was found to be 16 degrees, representing the net difference between the electrical signals from the sensing elements 40 and 42; later phase angle readings were corrected for this difference.

Power was then applied to the furnace in increasing amounts, by advancing the setting of the Variac, the system being allowed to come to equilibrium at each setting (as shown by constant readings of all thermocouples over a period of five minutes). The temperature of the two water jacket thermocouples was made exactly the same as the temperature of the thermocouple on the reference leg 18, by carefully controlling the flow of water through the jackets.

FIGURE 4 shows another embodiment of the present invention, which is generally designated as $10^1$ and comprises an acoustical transmission line including a transducer $12^1$, an acoustical coupling member $14^1$, and an acoustical coupling member or leg $16^1$, together with an acoustical absorber $20^{111}$. With the exception of the inclusion of only a single leg, rather than two legs, the descriptions of elements of this embodiment are the same as the descriptions of the elements of FIGURE 1. Embodiment $10^1$ also includes sensing elements $40^1$ and $42^1$, of the same type as the sensing elements in FIGURE 1 and attached to the acoustical transmission line in the same manner as described heretofore and operating in the same manner, being also used in conjunction with voltage amplifying circuits $44^1$ and $46^1$ and a phase angle meter $47^1$.

In the case of FIGURE 4, sensing element $40^1$ is positioned along acoustical coupling member 16¹ between the U-shaped heated section 59 disposed in the furnace 30¹ and the acoustical absorber 20¹¹¹. Sensing element 42¹, however, instead of being positioned along a separate coupling member, is positioned along member 16¹ between the coupling member 14¹ and the furnace 30¹.

Horizontal mounting of the apparatus 10¹ by means of floating roller bearing supports B and C permits freedom of movement of the system and stress loads due to heating and thereby relieved. Instead of circulating cooling water through jackets at each end of the heated section as in FIGURE 1, water controlled by valve 69 may be allowed to fall dropwise from pipes 64 and 66 onto absorbent asbestos pads 60 and 62 at each end of the heated section 59. However, care should be exercised to avoid unequal cooling of the pads, or the results may be erratic. A drain 68 may be provided to receive the drippings.

At thermal equilibrium of the apparatus 10¹ (i.e., when the respective portions of the leg 16¹ which are contacted by the respective sensing elements 40¹ and 42¹ are subject to the same environment such as a room temperature environment), a relationship will exist between the respective responses of the sensing element 40¹ and 42¹ to the acoustic traveling wave proceeding from the transducer 12¹ to the load represented by the acoustic absorber 20¹¹¹. This relationship may be referred to as the reference phase relationship.

However, when a portion of the leg 16¹ is heated between the respective locations of the two sensing elements 40¹ and 42¹, a new relationship will exist between the respective responses of the sensing elements. This relationship for any given embodiment will enable suitable temperature change indications, as indicated in connection with the embodiment of FIGURE 1.

It will be appreciated that cooling jackets may be dispensed with, particularly if, additional sensing elements are attached to the leg 16¹ on each side of the heated section. Thus, the thermal gradient along the leg 16¹ may be ascertained and used to ascertain phase shift.

Figure 5:
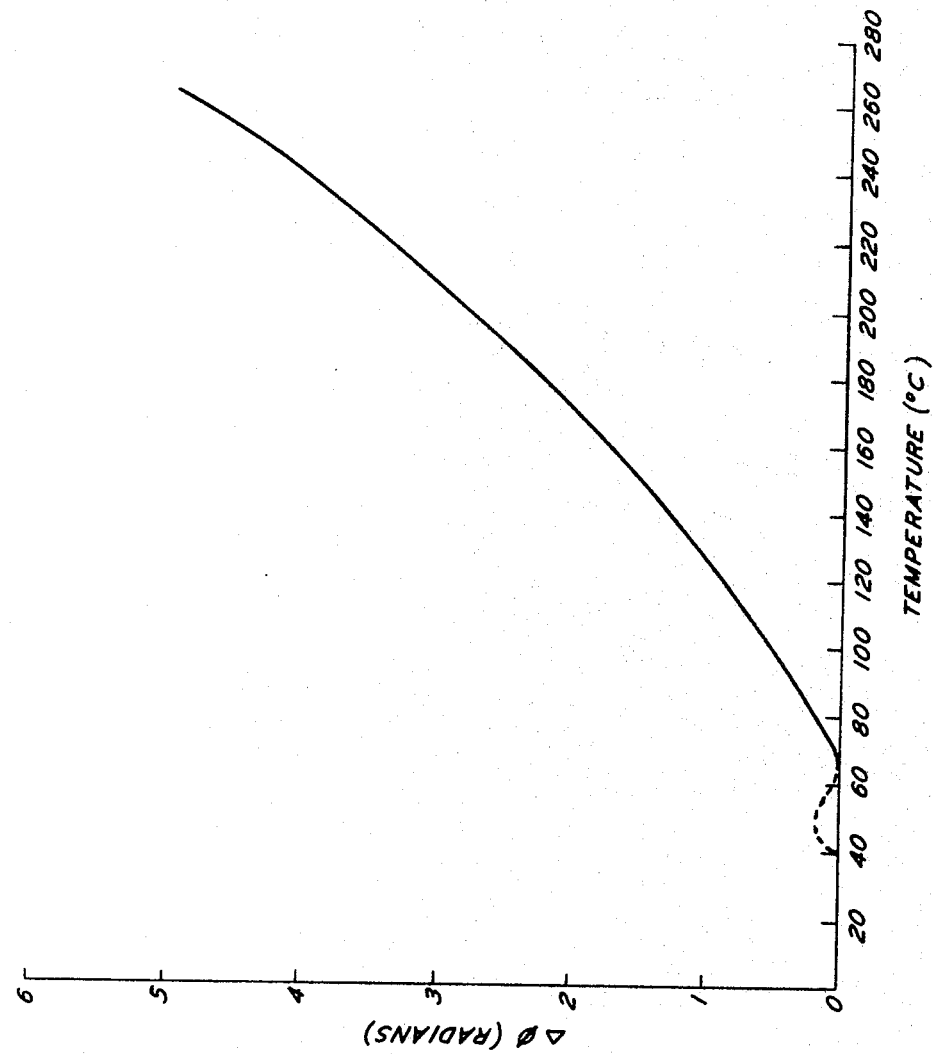
FIGURE 5 is a graph showing results obtained with the embodiment of FIGURE 4, using steel transmission lines.

FIGURE 5 depicts data obtained with cold-rolled steel as the acoustical material for leg 16¹ (see the description of FIGURE 3), with the appartaus designed to operate at a nominal frequency of 50,000 cycles per second, and using an electrical power input to the transducer of 0.5-watt. The heated zone on leg 16¹ was approximately 22 centimeters long. The results show good sensitivity and extreme precision.

It is to be noted that it is possible to drive the transducer 12¹ of the apparatus 10¹ at an electrical frequency which will produce an exactly zero phase difference between the responses of the sensing elements 40¹ and 42¹. When thermal equilibrium is upset, as by the elevating of the temperature of a portion of leg 16¹ between the locations of the two sensing elements to a higher-temperature, by adjustment of the driving frequencies, conditions can be created where the phase difference between the two signals can be brought back to zero. The difference in these frequencies can be related to the change in temperature.

Preferably, for support purposes and to minimize frequency shift of the vibratory apparatus and loss of vibratory energy to any associated supporting members, a force-insensitive mount or mounts (not shown) is attached to the apparatus, preferably to one of the acoustical coupling members, such as measuring leg 16 of FIGURE 1 or leg 16¹ of FIGURE 4.

Such a force-insensitive mount could be in the form of a sleeve, one-half wavelength long at the design frequency and made from steel or other low hysteresis material such as nickel-aluminum-bronze, beryllium-copper, or Monel. One end of the sleeve would be metallurgically bonded to the measuring leg 16, preferably at an antinode or loop region of the vibration on the measuring leg 16, and the other end of the sleeve would be free from attachment. The sleeve would be provided with a radially outwardly extending flange located one-quarter wavelength from the attached end of the sleeve, and a true acoustical node will develop in the sleeve at the flange. Reference is made to United States Patents Nos. 2,891,178, 2,891,179, and 2,891,180, each of which issued in the name of William C. Elmore and is entitled, "Support for Vibratory Devices." The flange would be removably secured to a support (not shown), as by a clamping ring and suitable bolts (not shown).

It is to be noted that both the measuring leg 16 and the reference leg 18 of FIGURE 1 may be provided with force-insensitive mounts, when it is desired to insert the terminal end of the apparatus into a container, for example, and/or to isolate sensitive electrical parts such as the transducer 12 from undesirable environments or to locate it at a distance from the medium whose temperature is to be examined, without sacrificing acoustical energy. In this case, an impervious seal could be obtained, with either the free end or the attached end of each mount extending through holes in the container top or lid, such container top or lid constituting a support, and with the flange being welded or brazed thereto for hermetic sealing purposes as requisite under continuous monitoring conditions.

As indicated in connection with FIGURE 3, an electrical power input of 9 watts to transducer 12 was used in obtaining the data, whereas in connection with the data of FIGURE 5, 0.5 watt was used. However, the power input to transducer 12 may be varied according to the operating conditions utilized and also the particular transducer-coupling system employed. It may be noted, though, that this is a matter of degree which is less significant in connection with the present invention, which is used for acoustical instrumentation purposes, than it generally is with respect to non-instrumentation applications wherein the workpiece or medium is to be acoustically influenced or irreversibly or reversibly changed in some manner. With the present invention, it is ordinarily sufficient that there be sufficient acoustical power transmission along legs 16 and 18 to be adequately detected by sensing elements 40 and 42.

As is well known to those skilled in the art, power output (to the work) of acoustical vibration devices is not readily ascertainable directly, and indirect determination thereof often involves the use of liquids and other aspects not suitable for ready adjustment to differing industrial applications. Moreover, permissible power input is variable according to the type of transducer utilized and the acoustical coupler geometries and materials used, as well as such factors as the efficiencies of joints between the various members of the transducer-coupling system (molybdenum, for instance, is particularly difficult to solder or braze properly). For example, a magnetostrictive transducer is far more rugged and trouble-free than a ceramic transducer, but it has a lesser efficiency in converting electrical power into mechanical vibration, and steel is a more readily machinable and joinable coupler material than Monel or beryllium-copper but it has a lesser acoustical transmission efficiency. The implications are obvious for differing amounts of acoustic power (expressed in electrical watts output from the power supply or input to the transducer) used with the present invention, even without taking a given temperature application into consideration.

When the present invention is used for temperature indications, both its sensitivity to temperature changes and its useful range of temperature indication will depend upon the choice of acoustic material utilized, especially for the legs 16 and 18 of FIGURE 1 or the leg 16¹ of FIGURE 4.

If the apparatus is to operate at 40,000 cycles per second and the legs 16 and 18 (and coupling member 14) of FIGURE 1 are made of aluminum, an accuracy of within about ¼-degree centigrade may be expected for temperature indications in the neighborhood of room temperature. This is assuming a length of heated section of leg 16 and corresponding section of unheated leg each being 1 meter, and a basic velocity of sound in aluminum 5,050 meters/second. On the other hand, under the same basic conditions, but used in connection with a temperature of about 600° K., a phase angle of 286 degrees could be expected.

While the embodiment of FIGURE 1 was indicated to have been designed for operation at vibrational frequency of 50,000 cycles per second, it will be appreciated by those skilled in the art that other frequencies may be used, inasmuch as 50 kc. merely gave a convenient size of apparatus for the application described. A power supply for a transducer such as transducer 12 is typically capable of producing electrical signals in the range of between about 60 cycles per second up to about 100,000 cycles per second or more (up to about 300,000 cycles per second). This frequency range is suitable for purposes of the present invention, including as it does frequencies in both the audible range (such as up to about 15,000 cycles per second) and the ultrasonic range (generally above 15,000 cycles per second). A preferred frequency would be in the range of from about 3,000 to about 60,000 cycles per second. As is well known to the art, an alternating current power supply is generally used (such as a 60 cycles per second supply) whose frequency is changed to match the mechanical or elastic vibratory frequency of the transducer or transducers used (50,000 cycles per second in FIGURE 1, as aforesaid).

The sensing portion of the measuring leg may be exposed to or be in intimate contact with a solid body which is hot or cold, a liquid bath which may be hot or cold, or a gas which may be hot or cold. When desired or convenient as with a liquid bath, the sensing portion may be U-shaped for ease of control over the length of the sensing portion and for ease of adaptation for use with existing equipment such as a steel furnace.

While it is contemplated that most usage of the present invention would be in connection with measuring temperatures from about 70° F. to about 3700° F., it will be obvious that temperatures as low as about 0° K. may be ascertained. For temperatures above about 3700° F., when the nature of the medium requires, the coupling member(s) may be made of ceramic materials such as graphite, zirconia oxide, etc.

The present invention may be embodied in other specific forms without departing from the spirit or essential attributes thereof and, accordingly, reference should be made to the appended claims, rather than to the foregoing description as indicating the scope of the invention.

It is claimed:

1. Measuring apparatus comprising an acoustical generator means, an elongated coupling member having one end portion coupled to said means for transmitting acoustical waves from said means, another end portion of said member being coupled to an acoustical absorber for absorbing the acoustical waves in said member, an intermediate portion of said member being adapted to be subjected to an environment whose characteristic is to be measured and which causes a phase change of the acoustic wave transmitted through said member, and means for detecting phase changes in the waves travelling through said member, said detecting means including a sensing device coupled to said member between said intermediate portion and said absorber.

2. Apparatus in accordance with claim 1 including a reference coupling member, one end portion of said reference coupling member being coupled to said generator means, another end portion of said reference coupling member being coupled to an acoustical absorber, a second sensing device coupled to said reference member, and said detecting means being coupled to each of said devices for detecting the difference in phase between acoustical waves being transmitted by said members to their respective absorbers.

3. Apparatus in accordance with claim 1 including means for cooling said coupling member on opposite ends of said intermediate portion.

4. Apparatus in accordance with claim 1 wherein said detecting means includes a second sensing device, said second sensing device being coupled to said member at a location in between said intermediate portion and said generator means, whereby differences in the velocity of waves travelling through said intermediate portion may be detected.

5. Apparatus in accordance with claim 1 wherein said member is made from molybdenum.

6. Apparatus in accordance with claim 1 wherein said member is made from cold rolled steel.

7. Apparatus in accordance with claim 1 wherein said member is made from aluminum.

8. Apparatus comprising a vibratory energy generator means, an elongated coupling member having one end coupled to said generator means, an acoustical absorber coupled to a portion of said coupling member remote from said one end for absorbing substantially all energy transmitted thereto from said member, a furnace between said generator means and said absorber, an intermediate portion of said coupling member being associated with said furnace so that the intermediate portion is at the temperature of the furnace, and means for ascertaining the temperature of said intermediate portion, said temperature ascertaining means being coupled to said member at a location between said absorber and said intermediate portion of said member, said temperature ascertaining means including a device for ascertaining the change in time for transmission of an acoustical wave through said intermediate portion due to the temperature of said intermediate portion, whereby the temperature of said intermediate portion may be ascertained.

9. Apparatus comprising a furnace whose internal temperature differs from the temperature of its environment, an acoustical means for ascertaining the difference between said internal temperature and a known temperature, said means including a coupling member and a device capable of detecting the difference in speed of transmission of a travelling acoustical wave in the coupling member due to the difference between said internal temperature of the furnace and the environment temperature, said coupling member having only a portion thereof subjected to said internal temperature, said means including an acoustical generator coupled to one end of said member and an acoustical absorber coupled to the other end of said member, and said device being connected to said member at a location thereon between said absorber and said furnace.

10. Apparatus comprising first and second elongated coupling members, one end of each member being coupled to means for generating an acoustical energy, an acoustical absorber coupled to the other end of each member, a separate sensing device coupled to each member at a location based substantially the same acoustical distance from said generating means, each sensing device being capable of generating an electrical signal as a function of acoustical waves being transmitted by its respective member, and a phase meter means coupled to each sensing device.

11. Apparatus comprising a magnetostrictive transducer, a resonant elongated coupling member having one end coupled to said transducer, an acoustical absorber coupled to the other end of said member, a phase sensing device having a mass not more than $\frac{1}{1000}$ of the mass of said member, said device coupled to said member at a location in between said absorber and an intermediate portion of said member which is adapted to be subjected to an unknown temperature, means for detecting phase changes in the waves traveling through said member due to said temperature, said detecting means including a phase meter coupled to said sensing device for indicating said unknown temperature.

12. Apparatus in accordance with claim 11 wherein said intermediate portion is U-shaped.

13. In a method of measuring temperature comprising the steps of introducing acoustical travelling waves in a coupling member, subjecting a portion of said member to the medium whose temperature is to be measured for a sufficient period of time until the temperature of said portion is different from the remainder of said member, and detecting any phase changes in the travelling waves in said member as compared with a standard for the material of said member at a known temperature.

14. In a method in accordance with claim 13 wherein said waves have a frequency of between 60 and 300,000 cycles per second, and said step of introducing waves in the coupling member being continuous for the period of time during which an indication of temperature is desired.

15. In a method in accordance with claim 13 wherein said introducing step includes continuously coupling vibratory energy to one end of said member during the period of time for which a temperature indication is desired, and absorbing the vibratory energy at an end of said member remote from the end into which vibratory energy is introduced.

16. In a method in accordance with claim 13 wherein said step of detecting phase changes includes using a pair of sensing devices coupled to said member at opposite ends of said portion of said member, and using a phase detector coupled to said devices, and generating an electrical signal by said devices which signals are coupled to said detector, and comparing the phase difference of said signals by said detector.

17. In a method of detecting temperature comprising generating accoustical waves, dividing said waves into two paths defined by a measuring leg and a reference leg, subjecting a portion of said measuring leg to heat at a temperature below the melting point of the material of said measuring leg and which temperature is different from the temperature of said reference leg, sensing phase angles of the waves travelling along said legs with the phase sensing of said measuring leg being accomplished between said portion and an acoustical absorber for said measuring leg, absorbing acoustical waves in said legs, and detecting the phase difference between waves travelling in said legs at locations which are substantially acoustically equidistant from the location wherein the waves are divided into the two paths.

18. In a method in accordance with claim 17 wherein said step of subjecting a portion of said measuring leg to heat includes disposing said measuring leg portion in the environment whose temperature is to be measured, and cooling said measuring leg at locations adjacent opposite ends of said measuring leg portion.

19. A method in accordance with claim 17 wherein the temperature to which said measuring leg portion is subjected is between about 70° F. and about 3700° F.

20. In a method of determining temperature of a medium comprising transmitting acoustical energy in the form of travelling waves through a solid coupling member having a portion of its length subjected to the temperature of said medium, generating an electrical signal as a function of the phase angle of travelling waves through said portion, generating an electrical signal representative of the phase angle of a known standard, and comparing said signals to ascertain the temperature of said medium.

References Cited by the Examiner

UNITED STATES PATENTS

| | | | |
|---|---|---|---|
| 2,667,063 | 1/1954 | Cunningham | 73—67.6 |
| 3,133,442 | 5/1964 | Werner | 73—290 |
| 3,214,976 | 11/1965 | Miller | 73—339 |
| 3,229,523 | 1/1966 | Boyd et al. | 73—290 |

OTHER REFERENCES

Sound Velocity in Water at 212° F.: J. D. McDade et al., Journal of the Acoustical Sec. of America, volume 31, No. 10, October 1959, pages 1380–1383.

LOUIS R. PRINCE, *Primary Examiner.*

D. McGIEHAN, N. B. SIEGEL, *Assistant Examiners.*